(12) United States Patent
Boone et al.

(10) Patent No.: US 7,685,091 B2
(45) Date of Patent: Mar. 23, 2010

(54) SYSTEM AND METHOD FOR ONLINE INFORMATION ANALYSIS

(75) Inventors: Gary N. Boone, San Matco, CA (US);
Owen E. Richter, Santa Clara, CA (US);
Neil Vijay Sheth, San Francisco, CA (US)

(73) Assignee: Accenture Global Services GmbH, Schaffhausen (CH)

(*) Notice: Subject to any disclaimer, the term of this patent is extended or adjusted under 35 U.S.C. 154(b) by 201 days.

(21) Appl. No.: 11/354,668

(22) Filed: Feb. 14, 2006

(65) Prior Publication Data
US 2007/0198459 A1 Aug. 23, 2007

(51) Int. Cl.
G06F 7/00 (2006.01)
(52) U.S. Cl. .................................. 707/1; 705/7
(58) Field of Classification Search .................. None
See application file for complete search history.

(56) References Cited

U.S. PATENT DOCUMENTS

| | | | | |
|---|---|---|---|---|
| 2003/0110181 A1* | 6/2003 | Schuetze et al. | ........ | 707/103 R |
| 2003/0195872 A1 | 10/2003 | Senn | | |
| 2004/0230461 A1* | 11/2004 | Talib et al. | ...................... | 705/7 |
| 2004/0243645 A1* | 12/2004 | Broder et al. | ................ | 707/200 |
| 2005/0256905 A1* | 11/2005 | Gruhl et al. | .............. | 707/104.1 |
| 2006/0284873 A1* | 12/2006 | Forrest et al. | ................ | 345/440 |
| 2007/0100875 A1* | 5/2007 | Chi et al. | ..................... | 707/102 |

FOREIGN PATENT DOCUMENTS

DE WO2005/059772 A1 6/2005

OTHER PUBLICATIONS

Yi, Jeonghee and Niblack, Wayne. "Sentiment Mining in WebFountain." Proceedings of the 21$^{st}$ International Conference on Data Engneering, 2005.
Gary N. Boone, PhD et al., "Online Analysis, Accenture, High performance.Delievered.," *Overviewvt.ppt*, to be published by USPTO, slides 1-25, Gary.N.Boone@Accenture.com, 2005.
Jerry Langton, "Buzz cuts through the on-line rumour mill," *Buzz cuts through the on-line rumour mill New search engine tries to seek out consumer gossip on blogs and forums—workopo . . .* p. 1 of 4, Toronto Star, www.thestar.com, 2005 Workopolis.com, Canada's Biggest Job Site, http://thestar.workopolis.com/servlet/Content/fastrack/20050804/TWBUZZ04?section=Science, Dec. 8, 2005.

* cited by examiner

*Primary Examiner*—Pierre M Vital
*Assistant Examiner*—Truong V Vo
(74) *Attorney, Agent, or Firm*—Fish & Richardson P.C.

(57) ABSTRACT

The present disclosure includes systems and techniques relating to online information analysis. In general, in one implementation, a system includes a collection engine configured to accumulate document information retrieved from publicly accessible network resources according to predefined subjects, and an analysis engine configured to analyze the accumulated document information to identify change over a time period in general discussion of a topic within a selected subject of the predefined subjects, the analysis engine further configured to normalize the identified change over the time period based on change in a total number of documents found for the selected subject during the time period.

21 Claims, 9 Drawing Sheets

K - Nearest Neighbor

- Instance-based Method
- Data is its Own Representation
- Nonlinear Representation: Piecewise Constants $$1720 \rightarrow \cos\Theta = \frac{A * B}{|A||B|} \quad \Theta = \cos^{-1}(A * B)$$

SYSTEM AND METHOD FOR ONLINE INFORMATION ANALYSIS

TECHNICAL FIELD

The present disclosure relates to discerning public opinions regarding specified subjects of interest, such as by computer-based analysis of the content of documents available over a network, such as the Internet.

BACKGROUND

Traditional public opinion discovery can be a time consuming and expensive process. To understand how one's brand, company or product is perceived, one would typically pay for polls, interviews, market surveys or focus groups. With the rise of the Internet, customer preferences and marketplace perceptions are discussed globally every day in publicly accessible online resources, such as online newspapers, magazines and forums, newsgroups, Usenet/Google groups, discussion boards and blogs. It's estimated that 10 million new pages are added everyday to the Internet. Thus, newly available machine-readable commentary on particular companies and products (including commentary from professional company analysts) are frequently added to the Web each day.

This publicly available information can be mined for information that may be useful for companies. For example, Intelliseek offers marketing activity monitoring to companies, where consumer generated information on the Web is analyzed to determine the effectiveness of a company's marketing. In addition, Sentiment Monitoring Service (SMS) is a Web analysis tool offered by Accenture, in which human experts provided a list of keywords used to pull information from the Web, where some of the keywords indicated topic relevance, and the remaining keywords indicated either positive or negative sentiments in relation to the topic.

SUMMARY

The present disclosure includes systems and techniques relating to online information analysis. According to an aspect, a system includes a collection engine configured to accumulate document information retrieved from publicly accessible network resources according to predefined subjects, and an analysis engine configured to analyze the accumulated document information to identify change over a time period in general discussion of a topic within a selected subject of the predefined subjects, the analysis engine further configured to normalize the identified change over the time period based on change in a total number of documents found for the selected subject during the time period. The collection engine can be configured to employ a two-stage document scraping process, a first stage including identifying links to follow for further document accumulation, and a second stage including extracting document text for a corpus. The collection engine can be configured to select, from a found document, a proper subset of links to follow, for further document information accumulation, based on proximity of the links to one or more keywords associated with a predefined subject. Moreover, the collection engine can be configured to vectorize found documents, and generate a reverse index of the document information.

The system can further include a user interface available as a Web service through a public network, the user interface configured to receive a user selection of the selected subject from the predefined subjects and to receive a user-defined query indicating the topic. The analysis engine can be configured to analyze the accumulated document information in response to the user-defined query, where the analysis engine enables user-defined interactive term searching within the user-selected subject. The analysis engine can be configured to analyze the accumulated document information to identify top issues, and to display indicators for the top issues, where the indicators denote a temporal change in prevalence for the top issues. The analysis engine can be configured to sort documents into categories of analytical interest using machine learning techniques and a document training set predefined for the categories of analytical interest, and to generate an analysis of category break down for the documents. Moreover, the analysis engine can be configured to identify novel words in the accumulated document information based on exponential type growth in word prevalence.

According to another aspect a method can include collecting documents from network resources according to predefined subjects to form corpora from the documents according to the predefined subjects, weighting token values for tokens identified in respective ones of the corpora to increase values of topic-indicating tokens, from the identified tokens, within respective ones of the predefined subjects, and generating an analysis of prevalence over a time period of one or more words in at least one of the corpora based on the weighted token values. The weighting can include adjusting a token count of a given token within a given document based on weighting factors incorporating a total number of tokens in the given document, a total number of documents in the at least one of the corpora, an average document length in the at least one of the corpora, and a number of documents in the at least one of the corpora that contain the given token.

The method can further include receiving, after the weighting, the one or more words in a user-defined query for a user-selected one of the predefined subjects. The generating can include normalizing the analysis based on a sum of weighted token values for the one or more words of the user-defined query, and creating a chart plotting change in prevalence of the one or more words of the user-defined query over the time period to indicate subject matter buzz trajectories over time. The generating can include analyzing prevalence over the time period of multiple issues in the at least one of the corpora, each issue including one or more words, identifying top issues from the multiple issues based on results of the analyzing, and displaying an indicator for each of the top issues, the indicator denoting a temporal change in prevalence of a corresponding top issue.

The method can further include sorting documents in the at least one of the corpora into categories of analytical interest using machine learning techniques, the weighted token values, and a document training set predefined for the categories of analytical interest. The generating can include generating an analysis of category break down for the documents in the at least one of the corpora based on results of the sorting. Moreover, the generating can include determining multiple time series of prevalence over the time period for tokens in the at least one of the corpora based on the weighted token values, checking the multiple time series for exponential type growth in prevalence, and identifying the one or more words as newly of interest based on exponential type growth in prevalence found in the multiple time series.

The collecting can include searching the network resources using keywords associated with the predefined subjects, identifying links to follow in documents found during the searching using multiple scrapers configured for different source document formats, and extracting text to retain from the documents based on the keywords and based on amounts of plain text found in partitions of the documents. The collecting can include searching the network resources using keywords associated with one of the predefined subjects, checking for the keywords in partitions of a document found during the searching, and selecting links from the partitions that contain the keywords for further data collection for a corpus corresponding to the one of the predefined subjects. In addition, the collecting can include retaining selected links for later data collection, and selectively following the retained links such that requests for different links to a single domain are separated by a predefined time interval.

Selecting the links from the partitions can include selecting the links based on proximity to one or more of the keywords in the partition. The document found during the searching can be a markup language document, and the partitions can be table cells in the markup language document.

The described systems and techniques can be implemented in electronic circuitry, computer hardware, firmware, software, or in combinations of them, such as the structural means disclosed in this specification and structural equivalents thereof. This can include a program operable to cause one or more machines (e.g., a signal processing device including a programmable processor) to perform operations described. Thus, program implementations can be realized from a disclosed method, system, or apparatus, and apparatus implementations can be realized from a disclosed system, program, or method. Similarly, method implementations can be realized from a disclosed system, program, or apparatus, and system implementations can be realized from a disclosed method, program, or apparatus.

Particular embodiments can be implemented to realize one or more of the following advantages. An online analysis system can provide insight into the market perceptions that companies care about (e.g., target market profiles, customer opinions of products, and company analyst perceptions). Publicly available online information can be used to glean the public's perceptions and sentiments regarding various subjects and topics of interest. An online analysis system can read news sites, discussion forums, blogs, Usenet news, and other online content, then use machine learning technology to understand and track the topics of interest to an organization, such as the topics discussed by a company's customers online. An online analysis system can track multiple websites daily, filtering them into universes of interest and analyzing each day's stories to create insight summaries. An online analysis system can watch buzz grow and fade, spot new topics, and analyze content to measure ongoing issues related to products, companies, and markets.

An online analysis system can track topics over time, allowing users to see how the issues that millions of people are reading/discussing evolve over time. This can assist users that need to respond to or manage such issues of public perception. For example, if you manage a pop singer, you may release a single to radio stations prior to releasing the full compact disc (CD). Online analysis can automate the process of looking for buzz generated by the single release, searching hundreds or thousands of online sources and providing daily summaries.

An online analysis system can facilitate the process of learning and understanding how a company or its products are perceived, whether by analysts or customers, so that one can correctly respond, market or innovate. The system can be used to better understand the topics one's customers discuss, tracking their interest and response to products, press releases, and advertisements. The system can monitor almost any topic online. For example, government health officials can focus on public reception of health messages. Political organizations can monitor public awareness of their issues. Venture Capital companies can watch the buzz around technological topics as they watch developing markets.

An online analysis system can list top issues, allowing users to summarize thousands of online articles very rapidly. Additionally, the system can break down conversations into further categories. For example, a mutual fund's marketing manager can use the system to determine whether, within a group of people discussing a fund, the people are talking more about retirement planning, fee structures or tax issues. The pop singer manager can see if fans talk more about the singer's looks or her style. This analysis capability makes it possible to understand not just how much discussion of a product is occurring, but how people are talking about it and what issues they care about. Thus, the online analysis system can help reveal the keys for success for products and services provided to the public.

The category break down techniques described can enable understanding the context and growth of underlying technology trends and can improve the accuracy of predictions regarding a technology's importance or likely success. Tracking a collection of emerging technologies can improve one's ability to anticipate important new technologies and provide competitive advantage against companies slower to understand new technology threats and opportunities. Emerging trends can be identified in similar fashion in other areas of interest as well, such as politics, entertainment, and consumer electronics.

Daily summaries of buzz and topical breakdowns can be provided, and new insights and feedback can be found for an organization that wants to match its products and services to market needs. In addition, the online analysis system can allow users to select a subject area from a set of predefined subjects for which the system has been configured to collect online documents on an ongoing basis. Within a predefined subject area, the system can enable a user to interactively search for keywords and obtain an analysis buzz over time, relating to the user-defined query. Thus, while an administrator may define the criteria used to collect documents according to predefined subjects to form corpora, the user is free to construct search strings to be applied to the information pulled from the corpora, thus enabling user directed analysis that the administrator did not originally anticipate when designing the document collection. Moreover, the system can alert users to novel topics by automatically looking for the signatures of breaking events.

An online analysis system can collect documents and form corpora for multiple industries. Users can then search a subset of the corpora as desired on a subscription basis. Thus, a company can be provided with tools to mine online data without requiring the company to have a large data collection operation, or even an employee hired to specify the criteria used for data collection.

The details of one or more embodiments of the present systems and techniques are set forth in the accompanying drawings and the description below. Other features, aspects, and advantages will become apparent from the description, the drawings, and the claims.

DETAILED DESCRIPTION

As used herein, the words "document", "story" and "article" refer to any discrete set of electronically stored information. A document, story or article does not necessarily correspond to a file, and may be stored in a portion of a file that holds other documents, stories or articles, in a single file dedicated to the document, story or article in question, or in multiple coordinated files (e.g., a document, story or article generated upon request by pulling together material from different portions of a database or repository). The word "buzz" refers to a level of interest in or attention paid to a subject or topic of interest. The word "corpus" refers to a collection of writings relating to a given subject. The words "token", "term" and "word" are often used semi-interchangeably in this specification for ease of description, however, it is to be understood that a "word" is any meaningful linguistic unit (and need not be present in any dictionary), a "term" is a word or group of words having a particular meaning, and a "token" is a unit of text parsing output, which may include one or more words or represent a group of words (e.g., the token "book" can represent both the word "book" and the word "books").

Figure 1:
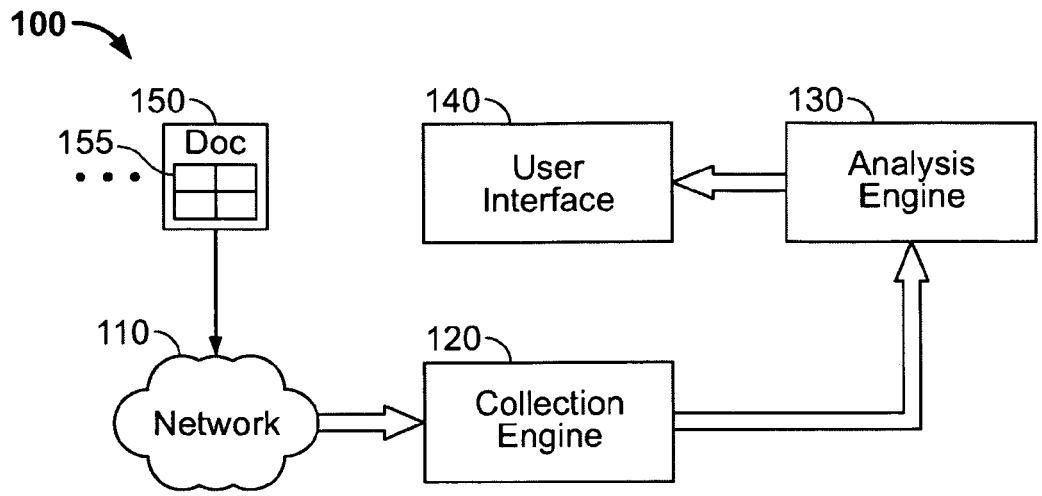
FIG. 1 shows an example online analysis system.

FIG. 1 shows an example online analysis system 100. The online analysis system 100 can include two major components: a collection engine 120 and an analysis engine 130. The collection engine 120 can pull relevant documents 150 from a network 110 (e.g., the Internet, World Wide Web or other public network) according to topical areas such as politics, technology, financial products, company or product names, industries, etc. The analysis engine 130 can analyze the collected documents to identify and track change in topics discussed online.

The system 100 can define a universe of interest (e.g., one or more predefined topical subjects to be monitored). The collection engine 120 can retrieve and store relevant stories from online sources (e.g., filter, process and store in a database) according to the universe of interest. For example, the system 100 can collect stories for a technology universe from general technology websites, forums, newsgroups, and blogs. The analysis engine 130 can then parse and vectorize these stories to extract insights, perform buzz searches, categorize the stories and generate visualizations that are presented to the user with a user interface 140 (which may be available as a Web service through the network 110).

The analysis engine 130 can identify change over a time period in discussion of a topic within one of the predefined subjects, where the identified change is normalized over the time period based on change in a total number of documents searched during the time period. For example, when calculating buzz values for a given search string over a thirty day period, the calculated buzz for each day can be divided by the total number of new documents found and searched on that day. In addition, the analysis engine 130 can perform caching to improve performance, such as caching document dates in the course of performing the interactive buzz searching described below. Caching can both speed up the system and improves accuracy by reducing the analytic burden on the analysis engine.

Figure 2:
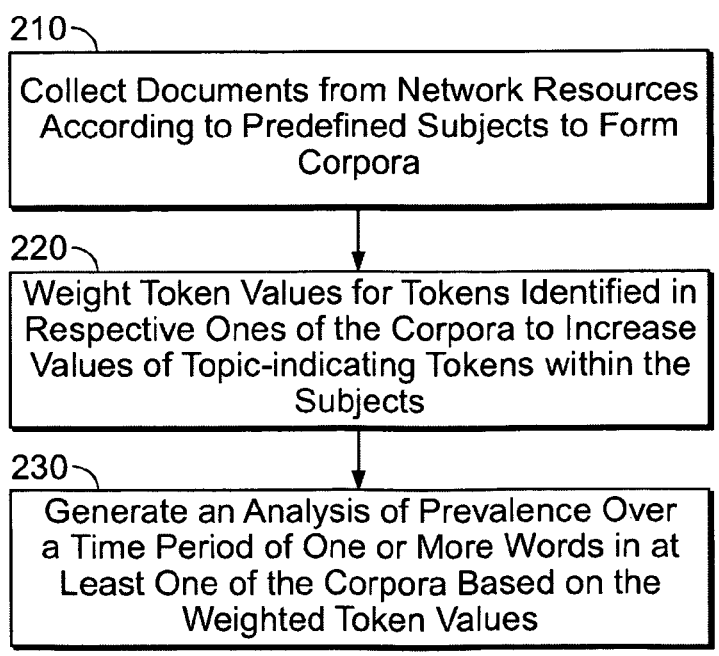
FIG. 2 shows a process of online analysis.

FIG. 2 shows a process of online analysis. Documents from network resources are collected at 210 according to predefined subjects to form corpora from the documents according to the predefined subjects. The system can be configured to ensure that at least a base number of documents (e.g., one hundred documents) are collected for a predefined subject before analysis is provided for that predefined subject (this can ensure that the system does not provide analysis results without first having a minimum level of confidence in the reliability of those results). The predefined subjects can be defined by a system administrator, who can define a set of sources (e.g., websites from which documents are pulled) and a set of features (e.g., search terms) that form the criteria for determining whether a document should be included in a corpus for a given predefined subject (e.g., presidential politics, radio frequency identification (RFID) technology, the entertainment industry, . . . ). Moreover, the search terms used in building a corpus can be initially refined by an iterative process to help ensure that the documents collected are appropriate for a given corpus; an initial small corpus can be built, the machine analytics described below can be applied, and the results compared with the actual documents in the corpus to identify search terms to retain, search terms to remove and search terms to add. This process can be repeated until a good set of search terms (keywords) have been obtained and the task of building the full corpus can begin. Once defined, the system can automatically update the corpus each day with new documents that match the search terms. Thus, the corpus can build up daily snapshots of the universe of interest as it grow each day.

The documents of a corpus can be parsed into tokens, stored and indexed, such as described further below, for later analysis. The document collection process should proceed over a period of time to build a corpus, where temporal information is retained for the documents. For example, document collection can occur on a daily basis over a period of a few to many days (e.g., thirty to ninety days), where documents that are new to the network each day are obtained for the corpus for that day. Thus the corpus represents a historical record of documents, found on the network over a period of time, for a given predefined subject.

Token values for tokens identified in respective ones of the corpora can be weighted at 220 to increase values of topic-indicating tokens within respective ones of the predefined subjects. This can involve using information theoretic techniques to automatically weight the words that indicate topics being discussed. Thus, tokens that a human may not recognize as being indicative of a given topic can be identified, such as words that are indicative of a given topic when used in connection with other words. Moreover, tokens that a human may believe to be topic indicating can be diminished in importance when they are used so often as to no longer be a good predictor of the topic. Such techniques therefore provide an advantage over traditional techniques that depend on humans to identify topic-indicating terms.

An analysis is generated at 230 of prevalence over a time period of one or more words in at least one of the corpora based on the weighted token values. The analysis can be generated any time after a sufficiently large initial corpus has been built and indexed. A corpus can be continuously built on an ongoing basis and changes in the corpus can be actively analyzed on a daily basis, such as described further below.

Figure 3:
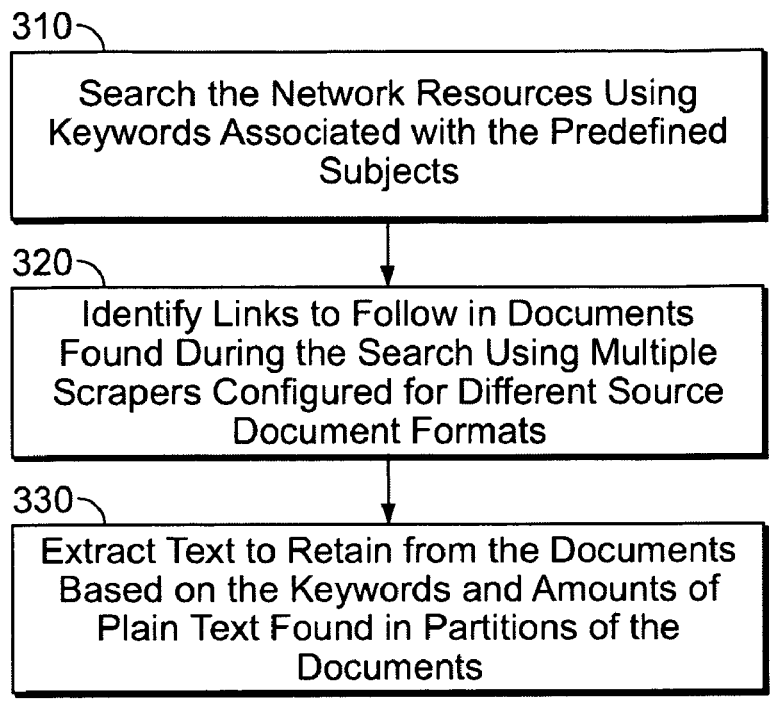
FIG. 3 shows an example process of document collection.

FIG. 3 shows an example process of document collection. Network resources can be searched at 310 using keywords associated with the predefined subjects. The documents found during the search can then be scraped to remove unwanted information. Many online documents include extraneous information with respect to the corpus being built. For example, many Web pages include links and advertisements that are not pertinent the story text needed for the corpus. The nature of this extraneous information can vary with the nature of the source (e.g., a major news website, such as CNN.com, versus a blog site).

In addition, the process of removing the extraneous information can vary with the information format used by a source. For example, many websites use a standard approach for grouping text with an associated link, such as link followed by text, or text followed by link (e.g., the format of links in an HyperText Markup Language (HTML) Web page). Multiple scrapers can be created and configured for different source document formats.

The scrapers can be assigned to groups of network resources based on the nature of the information being pulled from those network resources. The scrapers can act independently to extract text from found documents for use in the corpus, and to identify links for follow up searching. A scraper can include a specific set of rules for how to cut out advertising, how to identify story text to be retained for the corpus, and how to identify links to follow to find additional new documents. Alternatively, there can be two levels of scrapers: a first level of multiple scrapers that identify links to follow to find additional new documents, and one or more scrapers to extract story text from found documents. The multiple scrapers can include a message-board-search scraper for message boards, a news-group scraper for news groups, a news-post-text scraper for news sites in which the text comes after the link, a news-pre-text scraper for new sites in which the text comes before the link, a main-page scraper for sites that provide new text on the main page (but no links need to be followed deeper into the site), one or more search-site scrapers (e.g., a scraper that checks a blog search index, such as Technorati, to find blogs to follow), and an RSS (Really Simple Syndication) scraper for information access feeds.

These scrapers can be implemented in various ways. For example, in the blog scraper, the Technorati API (Application Program Interface) can be used to search for relevant blogs. Then, with a list of blogs in hand, each link can be followed; a URL (Universal Resource Locator) can be constructed, based on the hosting site of the blog, that will point to the individual blog post (as opposed to a page with a list of posts). For the post-text and pre-text scrapers, the text that is scraped can be the text description accompanying the link. The messageboard scraper can use the built in search functionality of most messageboard software in order to construct a query link that will result in list of links to follow.

Links to follow can be identified at 320 in documents found during the searching using the multiple scrapers. Identification of the links to follow can be based on proximity of the links to the keywords identified in the documents, as described further below. Text to retain from the documents can be extracted at 330 based on the keywords and based on amounts of plain text found in partitions of the documents. For example, if a document partition (e.g., a table cell in an HTML page), which includes one or more of the keywords, has a minimum number of characters and has more plain text than link text, then this document partition likely includes story text that should be extracted for the corpus.

Figure 4:
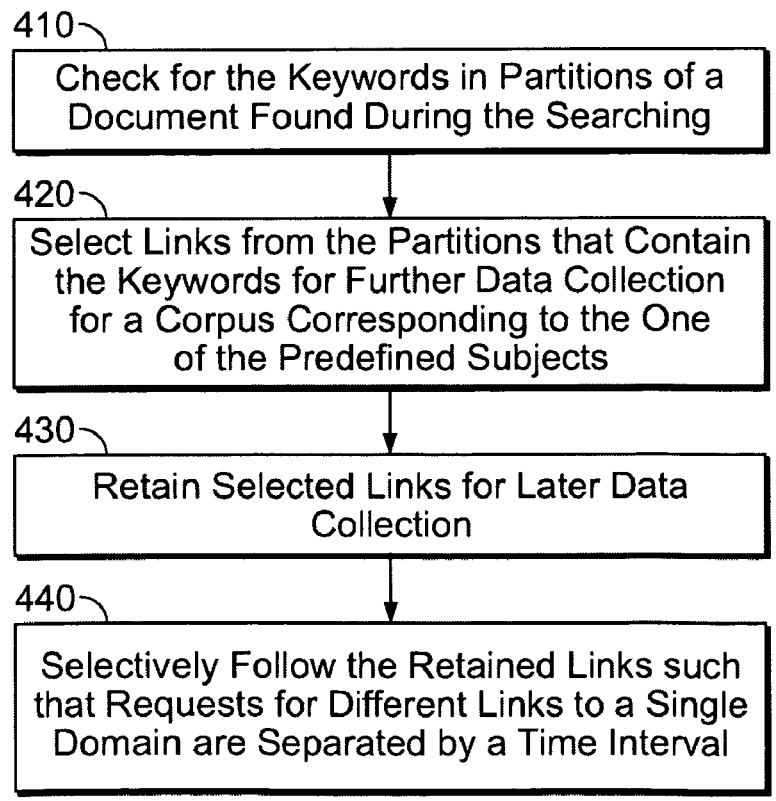
FIG. 4 shows an example process of identifying and following links during document collection.

FIG. 4 shows an example process of identifying and following links during document collection. The search keywords can be checked for at 410 in partitions of a document found during the searching. The document partitions can be previously known formatting elements that indicate separate portions of a document. For example, the documents found during the searching can include a markup language document, such as a HTML Web page, and the partitions can be table cells in the markup language document. As shown in FIG. 1, a document 150 can be a markup language document (e.g., an HTML page), and partitions 155 within the document 150 can be table cells (e.g., partitions defined by the "<td>" tag in HTML).

Links can be selected at 420 from the partitions that contain the keywords for further data collection for a corpus corresponding to the one of the predefined subjects. These links are often more likely to point to documents relevant to the subject of the corpus because they are included in a partition with text that is related to the subject. Other links in the document can be disregarded altogether or simply given a lower priority for follow up processing. In addition, the selection of links can involve selecting the links based on proximity to one or more of the keywords in the partition. Links that are closer to the keywords in the document can be given a higher priority for follow up than the rest.

Selected links can be retained at 430 for later data collection. For example, the links can be placed in a queue based on priority information obtained for the links. The retained links can be selectively followed at 440 such that requests for different links to a single domain are separated by a time interval (e.g., a predefined time interval). For example, access time information can be included with the links stored in a queue, and this access time information can be used to exclude from current consideration any links that point to a domain that has been accessed within the last fifteen seconds. This can prevent the system from placing an excessive processing burden on any particular server at any given time.

Figure 5:
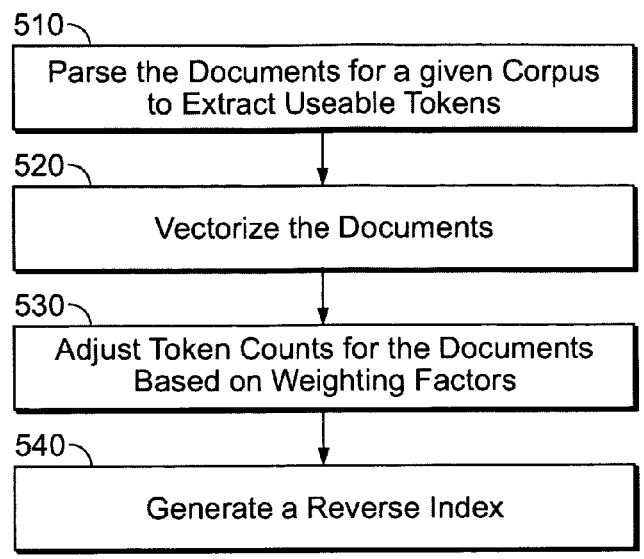
FIG. 5 shows an example process of indexing a corpus.

FIG. 5 shows an example process of indexing a corpus. Documents for a given corpus can be parsed at 510 to extract the usable tokens in the text. The parsing can use various truncation and stemming techniques to form the tokens gleaned from the documents. For example, in the interest of speed, the following simple parsing can be used. All capitalization, numbers, and punctuation can be ignored. For foreign languages, accents can be removed. The letter "s" can be stripped off from word ends. Words with more than 12 characters and fewer than 3 can be ignored altogether (these length parameters can be fully configurable). More advanced parsing techniques can be used (e.g., more nuanced solutions for reducing plural words to singular words can be used), which can result in less challenge for to the machine learning system described further below.

The resulting tokens can be checked against a stoplist (a list of barred terms). The use of a stoplist is a heuristic to reduce the machine learning burden. Stoplists remove words like "the", "and", "all", "over", "around", "for", "from", "that", "could", "there", and other words that are unlikely to provide useful category discrimination or topic information. Note that the weighting schemes described below can automatically perform stoplisting in a principled way. In effect, the stoplist heuristic is used to remove the head of the Zipf's Law distribution of word frequency.

The documents are vectorized (converted into numerical vector representations) at 520. Vectorization enables discovery of the collection of topics present in the documents by measuring the presence of meaningful, topic-indicating tokens. Occurrences of allowed tokens (the tokens resulting from the parsing) can be counted, and the token counts can be stored in a vector in which each location corresponds to a preassigned token from the dictionary of all tokens found in the documents of the corpus.

The initial vectorization creates a set of vectors that contain raw token counts. The token counts can be adjusted for the documents at 530 based on weighting factors. For a given document in a given corpus, the weighting factors can incorporate a total number of tokens in the given document, a total number of documents in the given corpus, an average document length in the given corpus, and a number of documents in the given corpus that contain the given token.

Figure 6:
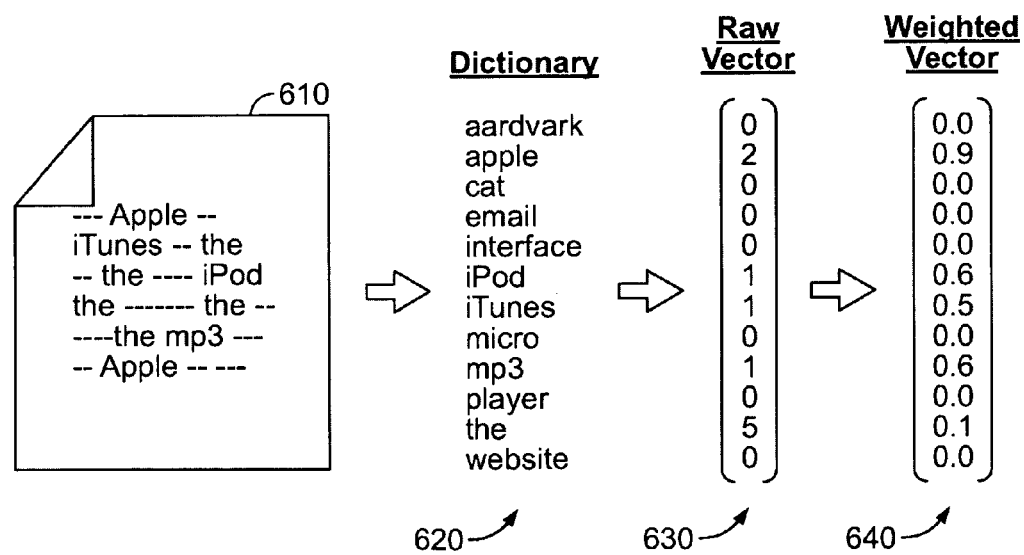
FIG. 6 is a block diagram showing an example parsing, vectorization and weighting process.

FIG. 6 is a block diagram showing an example parsing, vectorization and weighting process. Documents can be parsed into tokens, including a document 610, as described above. The allowed tokens define an n token dictionary 620. The document 610 can then be represented as an n-length vector 630 of raw word counts. This vector can then be weighted to increase the value of topic-indicating words, producing a weighted vector 640.

The weighting scheme applied should be designed to enhance the values of words that are topic-indicating (and thus predictive) and reduce the weights of non-predictictive words. For example, the word "iPod" may be predictive in a general technology universe because it would generally occur in documents about iPods, but seldom elsewhere. In contrast, the word "the", should it not be stoplisted, would occur in every document and have no topical predictive value. There are several methods available for applying useful weightings to vectorized documents. Some, such as Mutual Information use task information to learn which words best predict desired classes. Others use information theory to extract the terms that contain the most information.

The present system can use tfidf or Okapi BM25 (Best Match 25) weightings. The tfidf name stands for term frequency inverse document frequency and is formed by dividing the raw term frequency of a term in a document by the number of documents that contain the term. This weighting captures the intuition that words that occur frequently in a document are likely related to the topic of the document, unless they occur in many other documents as well. In practice, there are other terms in the tfidf equation to ensure numerical stability and normalize the values between 0.0 and 1.0. Okapi BM25 is a variation on tfidf that also accounts for document length so that terms in longer documents are not overly weighted.

In general, machine learning algorithms operate on real-valued vectors. By converting documents pulled from the Web into vectors, a great variety of techniques from statistics and machine learning can be applied. However, storing m n-element vectors, where m is the corpus size and n is the dictionary size, is a costly proposition. Thus, more efficient data structures should be used to store the vectorized documents.

It should be recognized that most documents do not contain most of the words in the corpus. Therefore, the vectors are typically sparse, containing mostly zeros. Instead of array-based vector structures, sparse representations can be created, which store only non-zero elements. For example, a linked list of tokens and their weighted frequency values can be used. Using sparse representations can often result in an order of magnitude reduction in vector size. Note that even with the sparse vector representation, the vectors are still n-dimensional, and the machine learning occurs in an n-dimensional vector space.

As described further below, one of the primary operations of the present system is to calculate dot products between queries and the documents in a corpus. A "query" here may be given by users (i.e., a search string) or may be a document, such as an unknown document that the system is trying to classify by finding similar documents. Thus, the vector data structures used to represent the vectorized documents should be designed to facilitate the dot product calculations.

Referring again to FIG. 5, a reverse index can be generated at 540. The sparse vector representation can reduce calculation load by eliminating multiplies for elements containing zeros. However, using just sparse vectors, calculating dot products between queries and every document in a corpus still involves the calculation of many dot products between orthogonal vectors. In other words, it can happen that none of the query terms intersect with any of the document terms. In this case, the dot product is zero and the traversal of the shorter vector was for naught.

Figure 7:
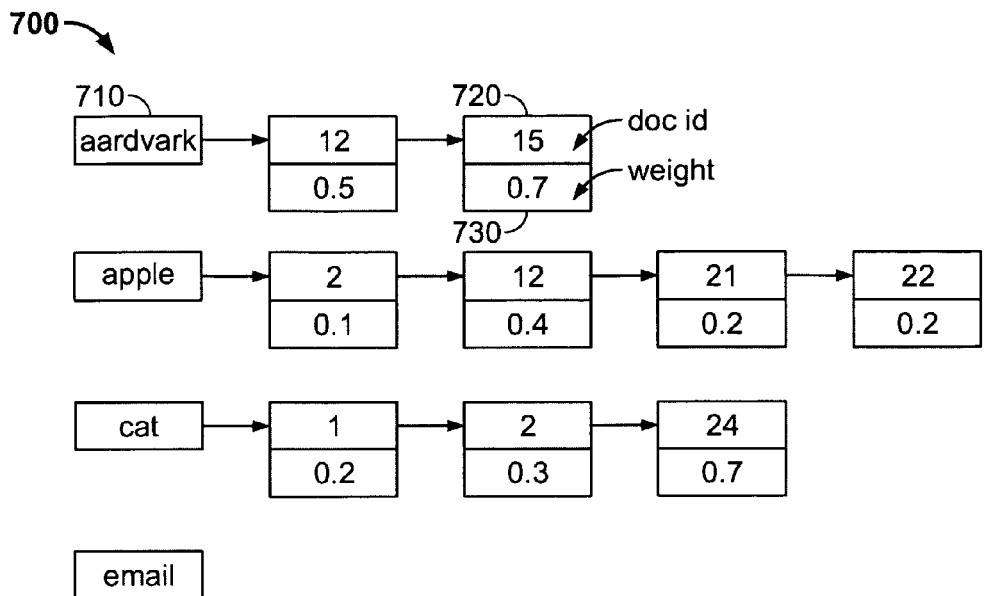
FIG. 7 shows an example reverse index.

A reverse index data structure can provide a mechanism to multiply queries only against documents that are non-orthogonal to the query. Instead of providing the page or in-document location of each word, as in a traditional index, the reverse index provides the document identifier (ID) for each term. FIG. 7 shows an example reverse index 700. A term 710 in the dictionary points to a list of documents that contain the term. An element in a term's document list contains a document ID 720 and the weight 730 of the term in that document. Thus, the reverse index maps words to the documents that contain them and gives the weight of the term in each of these documents.

To quickly calculate dot products, the system can read through each term in a query, find the term in the reverse index, then multiply the term's query weight with each document's given term weight. These products can be accumulated into a partial dot product for each document. After all of the query terms have been checked, the accumulated results are the complete dot products between the query and the documents. Thus, the system need only access the vectors that will have a non-zero contribution to the final dot product.

Figure 8:
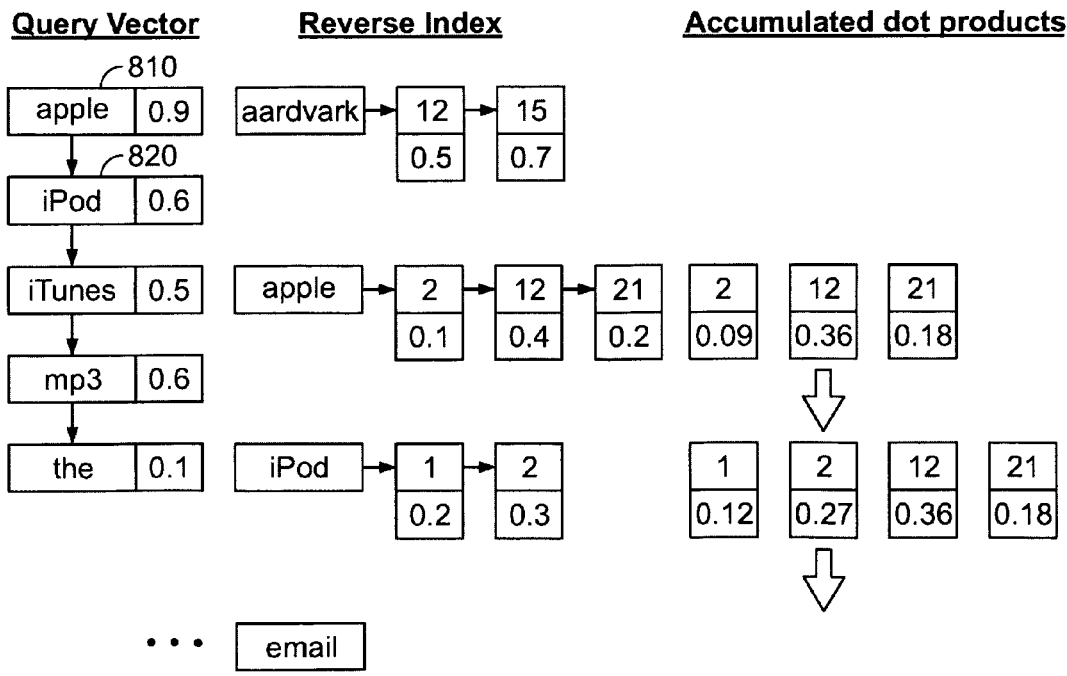
FIG. 8 shows an example of dot product calculation using a reverse index.

FIG. 8 shows an example of dot product calculation using a reverse index. In this example, the first query term 810 is "apple". In the reverse index, apple is found in documents 2, 12, and 21. The query weight is 0.9 which is then multiplied by the term weights in each document. After the first step, the partial dot products for documents 2, 12, and 21 are 0.09, 0.36, and 0.18, respectively. The next query term 820 is "iPod". Its products with documents 1 (0.12) and 2 (0.18) are added into the list of partial dot products. For document 2, there is already a partial sum present in the accumulated dot products list (0.09). The new product is added to the existing one: 0.09+0.18=0.27. After finishing the iPod query term, the system knows that there are non-zero dot products between the query and documents 1, 2, 12, and 21 that are greater than or equal to 0.12, 0.27, 0.36, and 0.18, respectively. The dot products are complete when there are no more terms in the query vector.

The generated index can be cached in order to avoid re-parsing and re-indexing all the collected documents. Once cached, the documents can be stored in a format that the analysis engine can use to perform calculations. Thus, the documents can be parsed, broken into tokens, and assigned count-based values for those tokens. By utilizing a cache, this machine-intensive process can be avoided for each calculation, resulting in significant processing time savings.

The discussion above describes a text search engine. Queries in the form of text strings or documents can be given to the system, and the system returns the set of nearest documents. Similar systems are used in corporate text repository management and online search engines. The online analysis system can use traditional text search engines in several novel ways, as described below. Moreover, the online analysis system can identify collections of online sources that define a universe of interest. For example, to follow politics, the system may combine news sites, political blogs, and political discussion forums. These sources can be mined daily for relevant content to form one or more corpora as addressed above (including converting the resulting documents into weighted vectors, which allows advanced statistical and machine learning algorithms to analyze them). Moreover, the system can use the corpora (which can increase in size on a daily basis) to create daily summaries that reveal emerging trends, and increasing or declining buzz around topics of business interest.

Figure 9:
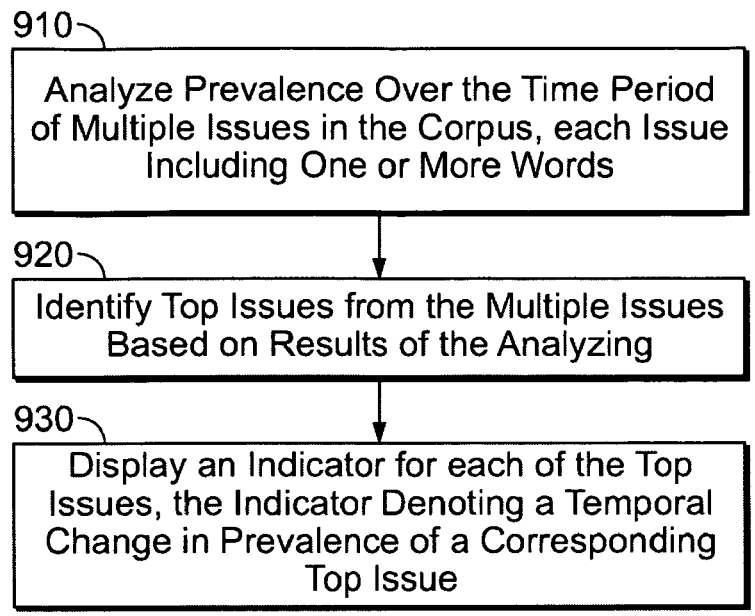
FIG. 9 shows an example process of generating an analysis of prevalence over a time period of words in a corpus.

FIG. 9 shows an example process of generating an analysis of prevalence over a time period of words in a corpus. The prevalence of multiple issues in the corpus, over the time period, can be analyzed at 910, where each issue includes one or more words. An issue can be a collection of terms or phrases, where the collection has a title that can be displayed. The title may, but need not be included in the words that are searched. For example, "apple ipod" may be the title for a group of search terms including "ipod", "mp3 player", "apple computer", and "itunes".

The period of time can be selected by a user, such as by selecting a thirty, sixty or ninety day time period. The search terms can be treated as a query and used to search the corpus of documents collected each day for the past thirty, sixty or ninety days. This search returns the buzz, which is defined as the sum of the distances (e.g., as measured by the k nearest neighbor algorithm described further below) between the query and each document in the corpus. Many documents are likely to have no matching terms and thus contribute nothing to the buzz value. The remaining documents can contribute a value proportional to how much the matching terms contribute to the document and the query. Because of these weightings, the system captures topics instead of just counting words.

Top issues from the multiple issues can be identified at 920 based on results of the analyzing. For example, the buzz values for the different issues can be ranked to produce a list of the top ten issues. An indicator for each of the top issues can be displayed at 930, where the indicator denotes a temporal change in prevalence of a corresponding top issue. For example, differences from the previous day can be calculated for each issue so that up and down arrows can be displayed.

Figure 10:
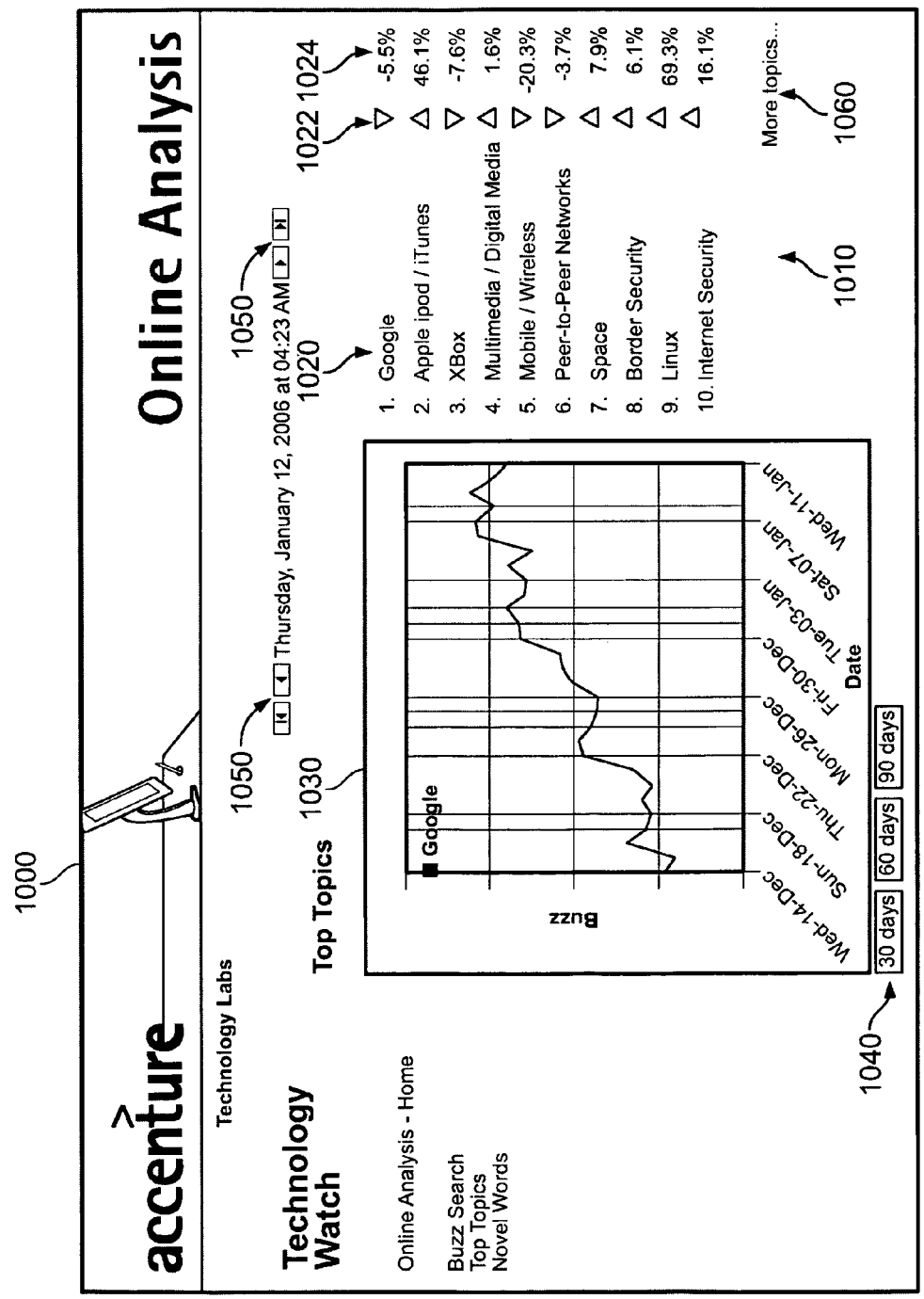
FIG. 10 shows an example user interface presenting the top ten issues for a given day for a predefined, technology watch subject.

FIG. 10 shows an example user interface 1000 presenting the top ten issues for a given day for a predefined, technology watch subject. The top ten issues 1010 for the day are shown along with additional information. The top issue for Thursday, Jan. 12, 2006 was "Google" 1020, which is shown along with a down arrow 1022, which indicates the change from the prior day. In addition, a percentage change 1024 is shown, and a chart 1030 of the buzz for the top issue over the last thirty days is presented. The chart 1030, as well as other charts generated by the system, can be created using ChartDirector, which is software (available from Advanced Software Engineering of Wanchai Hong Kong) that provides a set of high level primitives for creating a variety of different types of charts.

Different time periods for the chart 1030 can be selected by clicking on buttons 1040, and charts for other top issues can be generated in response to a user clicking on the titles of the top issues 1010 (the issue titles can be hypertext links to generate the respective charts). The chart 1030 itself can be composed of links to the documents in the corpus (e.g., clicking on the plotted line at a specific point can generate a popup window showing the stories for that day which contributed to the buzz for that day). Additionally, the analysis being presented can be adjusted forward or backward in time (e.g., day by day) using buttons 1050, and more issues can be presented by selecting a "more topics" link 1060.

Figure 11:
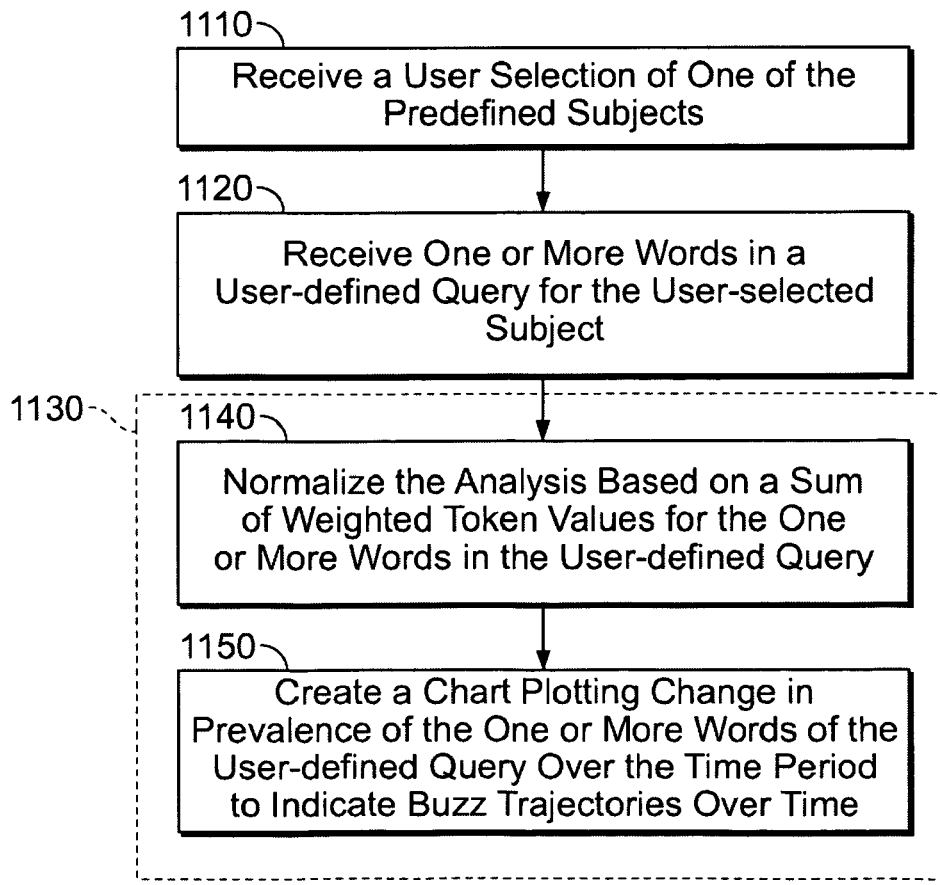
FIG. 11 shows an example process of interactive buzz searching.

FIG. 11 shows an example process of interactive buzz searching. After the collection and token weighting described above, a user selection of one of the predefined subjects can be received at 1110. One or more words in a user-defined query for the user-selected subject can be received at 1120. An analysis can be generated at 1130 of prevalence over a time period of the one or more query words in the corpus corresponding to the user-selected subject. This can involve normalizing the analysis at 1140 based on a sum of weighted token values for the one or more words in the user-defined query, and creating a chart at 1150 plotting change in prevalence of the one or more words of the user-defined query over the time period to indicate subject matter buzz trajectories over time.

Figure 12:
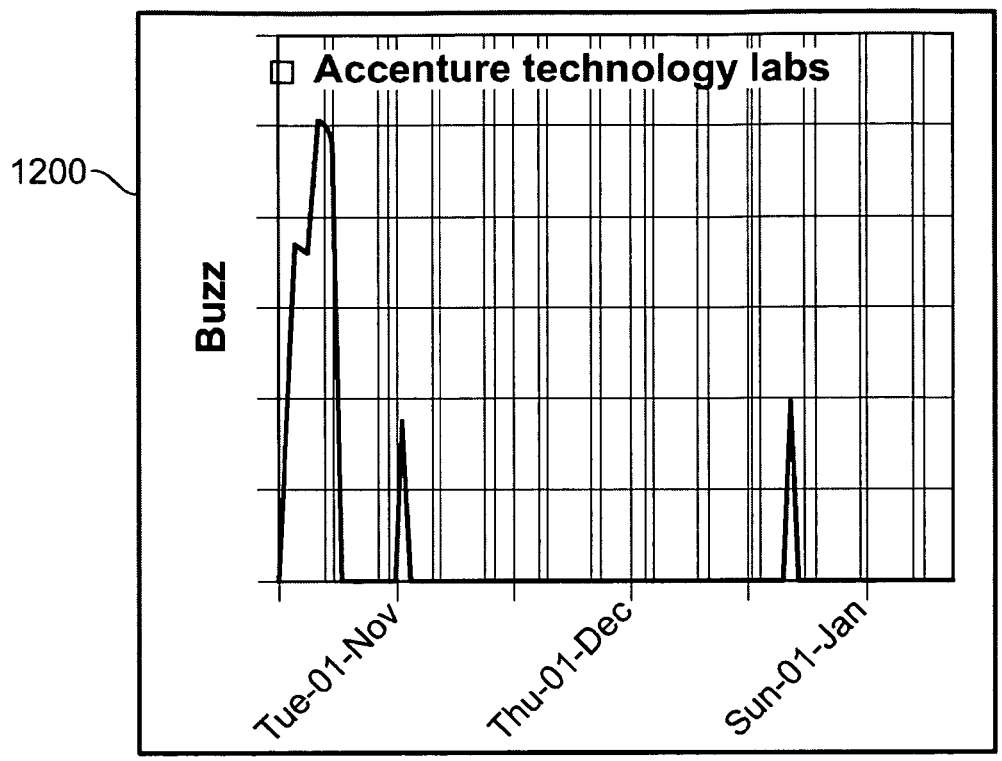
FIG. 12 shows an example chart plotting change in prevalence of one or more words in a user-defined query over a time period to indicate subject matter buzz trajectories over time.

FIG. 12 shows an example chart 1200 plotting change in prevalence of one or more words in a user-defined query over a time period to indicate subject matter buzz trajectories over time. In this example, the user-selected subject is the technology watch subject, the search string is "accenture technology labs", and the time period is the last ninety days, ending on Jan. 13, 2006. As shown, buzz surround this user-selected phrase, within the predefined technology watch subject, has gone through a series of three spikes from the last part of October through December. Thus, a user can search for arbitrary terms and get back a historical record of online buzz bases on those terms. The system allows one to select one of multiple broad areas of interest that the system has been defined to track (e.g., politics, arts and entertainment, music players, RFID, financial services, technology watch, . . . ), to construct a user-defined query and get back the buzz analysis that relates to that query.

New search strings can be entered and processed as desired, and thus the buzz search is an interactive process that generates and delivers buzz analysis dynamically. The user can change the time period of the analysis as desired (e.g., thirty, sixty or ninety day histories of any set of terms or phrases). The buzz calculations can be performed interactively, and the terms typed into the search box can be processed as described above for top issues, including weighting the terms of the user-defined query (the system can operate using the total buzz value for the user-defined query in order to normalize for queries of different lengths).

These interactive buzz searches provide on-demand insight for users. In contrast with summaries of search engine queries, such as provided by Google and Yahoo!, the online analysis system provides topic analysis and tracking. Thus, the system can be understood as an online document summary engine, rather than an online document search engine. Moreover, the online analysis system can actively update the corpora on a daily basis, and the interactive nature of the buzz search functionality allows users to continuously explore buzz by typing in new queries and studying the results (as before, the plot itself can be a series of hyperlinks, enabling the user to rapidly pull up and review the actual stories that contribute the buzz in a given time period).

Figure 13:
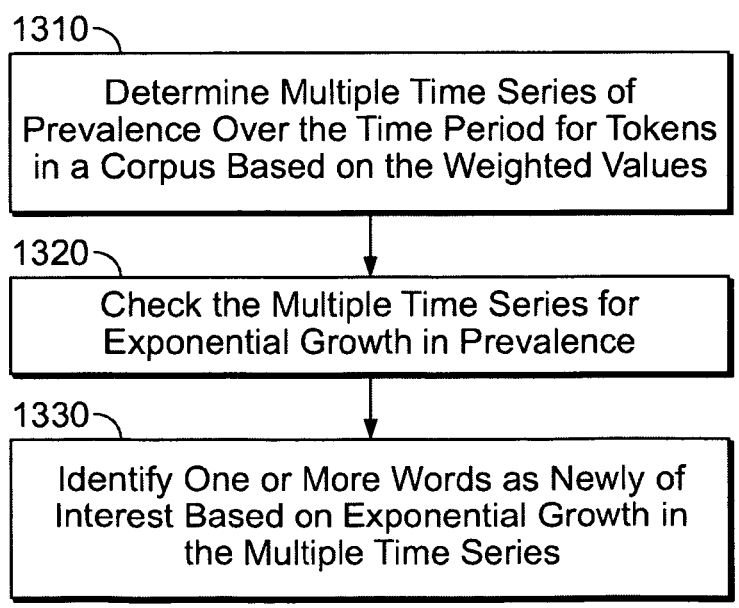
FIG. 13 shows another example process of generating an analysis of prevalence over a time period of words in a corpus.

FIG. 13 shows another example process of generating an analysis of prevalence over a time period of words in a corpus. Multiple time series of prevalence over the time period for tokens in a corpus can be determined at 1310 based on the weighted token values. The multiple time series can be checked at 1320 for exponential type growth in prevalence (e.g., the "hockey stick" approach described below). Then, one or more words can be identified at 1330 as newly of interest (novel) based on exponential type growth in prevalence found in the multiple time series.

Novel terms can be detected by calculating how well they match an idealized novelty event. This novelty detection involves watching for terms that are initially unpopular, which then rapidly increase in their popularity. The upward rise can be approximated as linear, and novel terms can be detected by measuring thirty day term plots against an idealized "hockey stick" novelty plot, as shown in FIG. 14.

Figure 14:
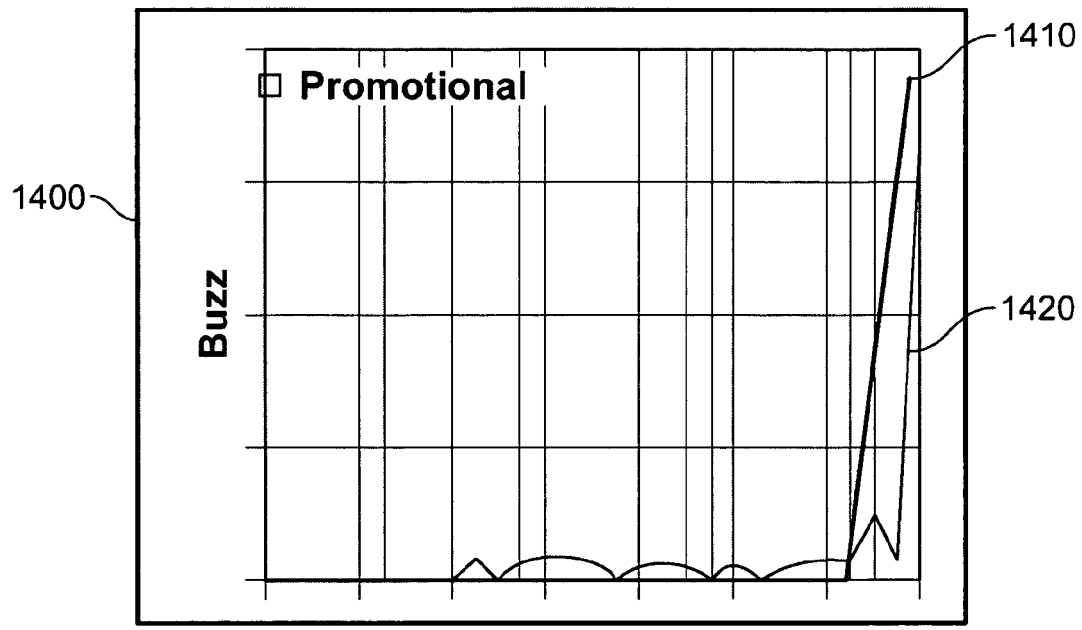
FIG. 14 shows an example chart of buzz for a novel term.

FIG. 14 shows an example chart 1400 of buzz for a novel term. An idealized novelty plot 1410 is overlaid on an actual buzz plot 1420 for the term "promotional". The upward sloping portion of the ideal plot 1410 can be fit to actual data using the last week of data. In comparison with the actual buzz plot 1420, the idealized plot 1410 fits the upward slope of the actual plot 1420 fairly well. However, the fit is not exact because the upward slope regression includes points from the last week that are not part of the upward slope.

To create the measure, a univariate linear regression can be modified. The system can perform standard linear regression over the last week of the data, producing a slope and intercept for the upward rise. If the data doesn't rise, the slope will be flat or negative. For the first three weeks, the idealized plot 1410 is a line with zero slope and zero intercept. The r-squared measure of linear regression can be changed to measure the fit of the data over both idealized segments, the flat line and the positive values of the upward slope. The result of this modification is that r-squared now measures how well the plot matches a hockey-stick-like graph.

Novel terms can be ranked using a weighted sum of three features. The first can be the r-squared value from the modified linear regression. The second can be the maximum value of the thirty day buzz plot of the term. The third can be the slope of the line fitted in the last week. These three measures combine to give highest priority to terms that appear suddenly and rise quickly to large buzz values.

With the modified regression and weighting, the novelty of any term can be measured. The online analysis system can display a small set of novel terms each day, using the given day's dictionary as a source of terms. The novelty of each of these terms can be calculated, then ranked (only partial ranking may be needed). These dictionaries can be between 12,000 and 25,000 terms in size.

Figure 15:
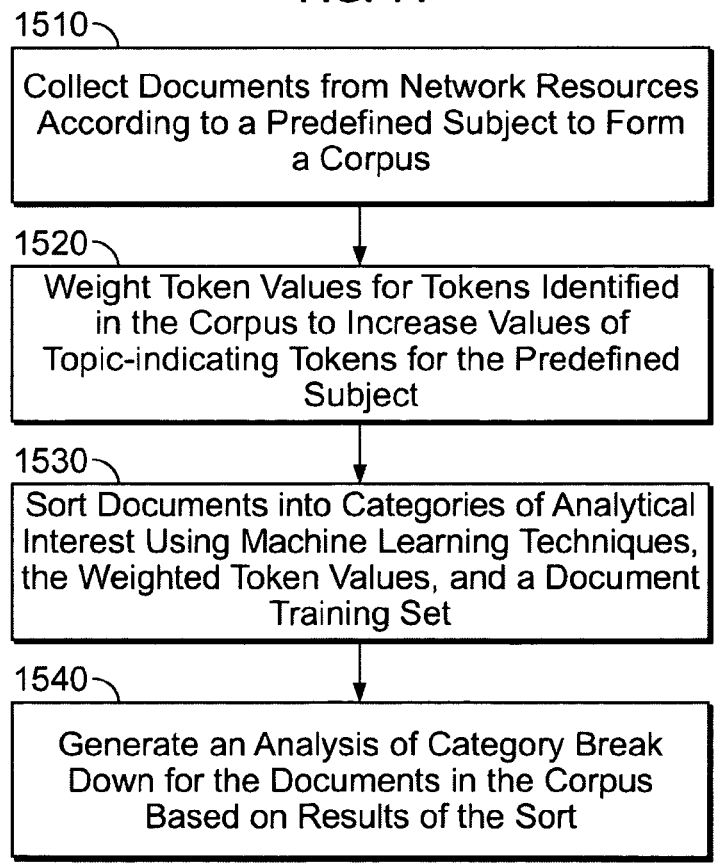
FIG. 15 shows an example process of document classification.

FIG. 15 shows an example process of document classification. Documents can be collected at 1510 from network resources according to a predefined subject to form a corpus, such as described above. Token values for tokens identified in the corpus can be weighted at 1520 to increase values of topic-indicating tokens for the predefined subject, such as described above. Documents in the corpus can be sorted at 1530 into categories of analytical interest using machine learning techniques, the weighted token values, and a document training set predefined for the categories of analytical interest.

The online analysis system can apply classification techniques to better analyze the contents and contexts of collected documents. Classification can characterize stories according to previously learned topic categories, where the topic categories are learned from examples. In many cases, it would be difficult for humans to choose keywords or define queries that would capture all of the variations and subtopics present in a desired category. For example, movie reviews for good movies use many similar terms as those for bad movies, making it difficult to define a query that would separate positive movie reviews from negative ones. The machine, however, can learn from examples to choose the words that separate these classes.

Use of machine learning classification techniques shift the human's burden from choosing the queries to choosing the examples used for learning. In general, it is easier for people to identify examples than to analyze and determine class indicators. In other words, it's easier for people to say whether a movie review is positive or negative than to choose the statistically significant words that evidence positive versus negative reviews.

The online analysis system can include a set of Web pages used to classify stories. For a given universe of interest (e.g., RFID technology) stories can be collected as described above. The system can then sample the stories randomly and present them to users through a Web page interface for classification. The human can use checkboxes to indicate class membership and hit the submit button. The classification schemes can be determined in advance by a system administrator or setup team.

The classification scheme can include multiple levels of classification. For example, stories in a politics universe can be classified into foreign or domestic, and domestic issues can be classified into economy, energy, education, crime, security, healthcare, taxes, budget, etc. During the training phase, the system administrator or set up team can read stories and check the appropriate boxes to assign class labels to several hundred stories. This training set can then be used by the machine learning system (using machine learning and statistical association techniques) to create a system that can then classify new, unknown stories each day. Moreover, further input parameters (in addition to the text of the documents themselves) can also be used by the machine learning system for article categorization, such as the source domain for an article.

In general, more training data leads to better results, but note that when a team of people are used to generate the training set, the team should be trained on how to interpret the categories to increase the consistency and reliability among categorizations made by different team members. For example, is it a tax story if it mentions taxes or must the story be primarily about taxes? If a story is about taxes and education, should both taxes and education be checked, or just the predominant one? These decisions should be made consistently to allow the system to learn from consistent training data.

Figure 17:
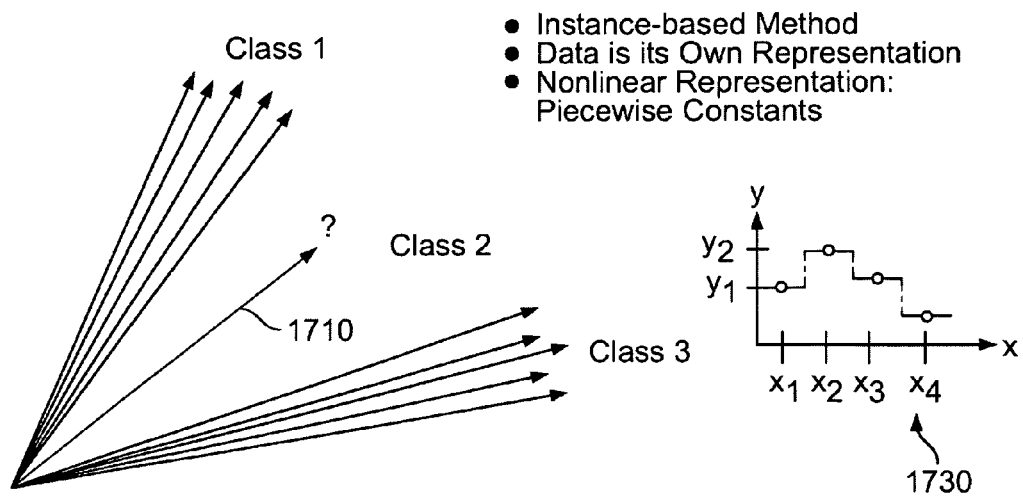
FIG. 17 illustrates the k-nearest neighbors technique.

To perform the classification, the online analysis system can use the k-nearest neighbors. The k-nearest neighbors technique is a nonlinear approximation technique that features fast training and scales linearly with the training set size. FIG. 17 illustrates the k-nearest neighbors technique, which can be used to determine the class of an unknown example.

An unknown vector 1710 is to be classified. By calculating the distance to the other vectors, the nearest k (e.g., the nearest fifteen neighbors) can be determined. These vectors contribute votes: the class of the majority is assigned to the unknown example 1710. Distances between vectors are calculated using an inverse cosine metric 1720, which includes a dot product between vectors. The nearest neighbor approximator can be viewed as a collection of piecewise constants. Each piecewise segment is a boundary between classes. In the one dimensional function 1730, assigning the y value corresponding to the nearest x for every unknown input x will trace out a nonlinear function approximator consisting of piecewise constant y values.

Other techniques can also be used for classification, such as regression, neural nets, or SVMs (Support Vector Machines). Note that such techniques may provide more compact data representations and generate predicted values more quickly, resulting in improved result recall over k-nearest neighbors.

Figure 16:
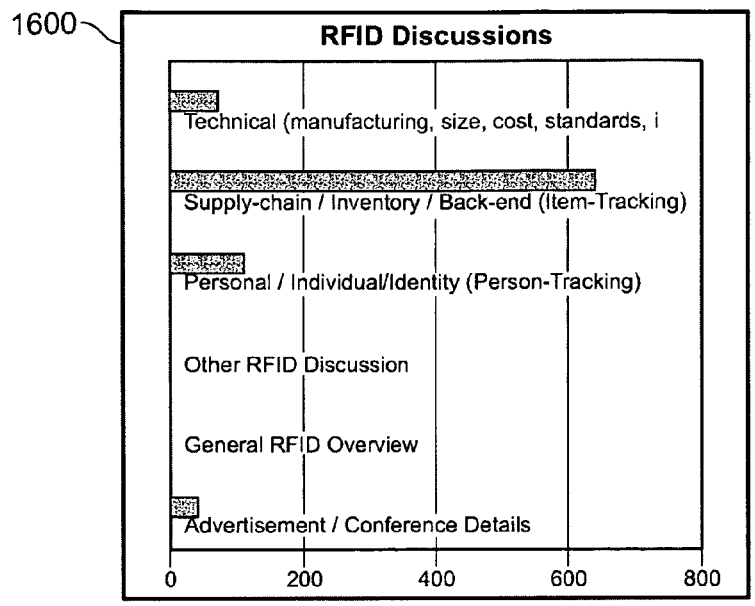
FIG. 16 shows an example chart of an analysis of category break down for classified documents.

Referring again to FIG. 15, an analysis of category break down for the documents in the corpus can be generated at 1540 based on results of the sorting. FIG. 16 shows an example chart 1600 of an analysis of category break down for classified documents in the RFID universe. In this example, the system shows the classes as bar graphs whose length is determined by the number of stories that are classified into each category. The categories in this example are (1) Technical (manufacturing, size, cost, standards, industry, etc.), (2) Supply-chain/Inventory/Back-edn (Item-Tracking), (3) Personal/Individual/Identity (Person-Tracking), (4) Other RFID Discussions, (5) General RFID Overview, and (6) Advertisement/Conference Details.

This type of category break down enables analysis of larger historical trends for subjects of interest. For example, technologies typically do not appear fully formed, ready for application. Instead, early versions move among communities of interest as they appeal to different needs and solve varying problems. The present systems and techniques can track the emergence of technologies by monitoring their discussion among various stakeholder communities. Technology trajectories may be better understood and predicted by comparing new technologies to those with similar emergence histories.

The category break down analysis can be used to show where lies the center of gravity of the conversations about selected search terms. This can help in business planning, such as for new and emerging technologies. The end user can see not just how much buzz there is, but what type of buzz it is (e.g., is it coming from technical articles or from more business oriented articles or from more consumer oriented articles). Thus, a subject can be analyzed in terms of which online community the buzz is coming from. Note that an online community can encompass a wide array of sources, including online newspapers, blogs and forums.

Examples of online communities that can be tracked include: (1) Academics, (2) Venture Capitalists, (3) Startups, (4) Technical press, (5) Technical community/Slashdot, (6) Information Technology press, (7) Industry/Trades, (8) Industrial Labs, (9) Leading Technology Companies, (10) Tier 1 Press (e.g., The New York Times, CNN, etc.), and (11) Software Application communities (e.g., SAP). The online analysis system can track such communities by building a universes of interest focused on each one, and building trackers that locate new technologies among the communities and track their movement among them. This enables the monitoring of historical movements of technologies through communities that should allow one to make predictions about new technologies. For example, one may be able to say that VoIP-mail (voice mail using Voice Over Internet Protocol), a new technology, is likely to see primarily a consumer impact because it is following the same track (Techical presss→Popular press→Venture Capitalists) as podcasting.

Such community tracking systems can provide a new empirical basis for understanding and predicting technology growth. Moreover, such community tracking systems can provide insights into complex issues, such as the rate and impact of a technology's emergence, the potential market for a new technology, the relationship between public buzz within communities to commercial success, the technological or commercial commonalities among technologies that follow similar public-buzz trajectories, and whether the trajectories of emerging technologies can be shifted by increasing buzz in a particular community.

Embodiments of the present systems and techniques, and all of the functional operations described in this specification can be implemented in digital electronic circuitry, or in computer software, firmware, or hardware, including the structures disclosed in this specification and their structural equivalents, or in combinations of them. Embodiments of the present systems and techniques can be implemented as one or more computer program products, i.e., one or more modules of computer program instructions encoded on a computer readable medium for execution by, or to control the operation of data processing apparatus. The computer readable medium can be a machine readable device, e.g., a machine-readable storage device, storage medium, or memory device, or multiple ones of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Information carriers suitable for storing computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the present systems and techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the present systems and techniques can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the present systems and techniques, or any combination of such back-end, middleware, or front-end components. The components of the system can be interconnected by any form or medium of digital data communication, e.g., a communication network. Examples of communication networks include a local area network ("LAN"), a wide area network ("WAN") and a network of networks, e.g., the Internet.

The computing system can include clients and servers. A client and server are generally remote from each other and typically interact through a communication network. The relationship of client and server arises by virtue of computer programs running on the respective computers and having a client-server relationship to each other.

Particular embodiments of the present systems and techniques have been described. Other embodiments are within the scope of the following claims. For example, the actions recited in the claims can be performed in a different order and still achieve desirable results, and an online analysis system (as described) can include all of the operational features described above or just a proper subset of them. The user interface functionality described can be implemented in a browser toolbar (e.g., for Internet Explorer available from Microsoft of Redmond, Wash.) in which one can do direct buzz searches on a technology universe and receive browser toolbar notification of any new novel terms found in the technology universe. Moreover, the system can be implemented with multiple computers on a network such that different computers perform different parts of the online analysis scraping, indexing, calculation, user interaction, and presentation. Different parts of the system can be more mobile than others; for example, the user interaction or presentation could be handled by mobile phones, Personal Digital Assistants (PDAs), handheld gaming systems, or other portable devices.

What is claimed is:

1. A computer-implemented method comprising:
    accumulating multiple historical collections of blog entries, the blog entries each having been retrieved from a network and each satisfying predefined source and subject matter criteria;
    scraping, then tokenizing, then stoplist filtering, then vectorizing, then weighting, then normalizing the historical collections of the blog entries;
    receiving a first user input identifying a subject of which a user intends to analyze prevalence over time in the historical collections of blog entries, the subject being associated with a collection of query terms;
    determining the query terms associated with the identified subject;
    selecting a single historical collection of blog entries corresponding to the identified subject, from among the multiple, normalized historical collections of blog entries;
    determining the prevalence of the query terms over time within the single selected historical collection;
    generating a line chart illustrating a change in the determined prevalence of the query terms over time, a line of the line chart including points which define hyperlinks to one or more blog entries of the selected single historical collection;
    receiving a second user input selecting one of the hyperlinks; and
    presenting the blog entry associated with the selected hyperlink.

2. The method of claim 1, wherein:
    generating the line chart further comprises generating a line chart illustrating the change in the determined prevalence over a time period specified by the user.

3. The method of claim 1, wherein the historical collection is weighted using an Okapi BM25 or Term frequency inverse document frequency (TFIDF) approach.

4. The method of claim 1, wherein the historical collection is vectorized using n-dimensional sparse vector arrays.

5. The method of claim 1, wherein the historical collection is weighted based on performing a dot product of a reverse index of the vectorized historical collection, and weights associated with the query terms.

6. The method of claim 1, further comprising identifying one or more weights associated with the collection of query terms.

7. The method of claim 1, wherein determining the prevalence of the query terms further comprises:
    determining whether a univariate linear-regression of the prevalence of the query terms exhibits a shape associated with an idealized novelty event.

8. The method of claim 7, wherein the shape associated with the idealized novelty event comprises a horizontal linear shape followed by a sharply upward linear shape.

9. A computer-readable medium encoded with a computer program comprising instructions that, when executed, operate to cause a computer to perform operations comprising:
    accumulating multiple historical collections of blog entries, the blog entries each having been retrieved from a network and each satisfying predefined source and subject matter criteria;
    scraping, then tokenizing, then stoplist filtering, then vectorizing, then weighting, then normalizing the historical collections of the blog entries;

receiving a first user input identifying a subject of which a user intends to analyze prevalence over time in the historical collections of blog entries, the subject being associated with a collection of query terms;

determining the query terms associated with the identified subject;

selecting a single historical collection of blog entries corresponding to the identified subject, from among the multiple, normalized historical collections of blog entries;

determining the prevalence of the query terms over time within the single selected historical collection;

generating a line chaff illustrating a change in the determined prevalence of the query terms over time, a line of the line chart including points which define hyperlinks to one or more blog entries of the selected single historical collection;

receiving a second user input selecting one of the hyperlinks; and presenting the blog entry associated with the selected hyperlink.

10. The computer readable medium of claim 9, wherein:

generating the line chart further comprises generating a line chart illustrating the change in the determined prevalence over a time period specified by the user.

11. The computer-readable medium of claim 9, wherein the historical collection is weighted using an Okapi BM25 or Term frequency inverse document frequency (TFIDF) approach.

12. The computer-readable medium of claim 9, wherein the historical collection is vectorized using n-dimensional sparse vector arrays.

13. The computer-readable medium of claim 9, wherein the historical collection is weighted based on performing a dot product of a reverse index of the vectorized historical collection, and weights associated with the query terms.

14. A system comprising:

one or more computers; and a computer-readable medium coupled to the one or more computers having instructions stored thereon which, when executed by the one or more computers, causes the one or more computers to perform operations comprising:

accumulating multiple historical collections of blog entries, the blog entries each having been retrieved from a network and each satisfying predefined source and subject matter criteria;

scraping, then tokenizing, then stoplist filtering, then vectorizing, then weighting, then normalizing the historical collections of the blog entries;

receiving a first user input identifying a subject of which a user intends to analyze prevalence over time in the historical collections of blog entries, the subject being associated with a collection of query terms;

determining the query terms associated with the identified subject;

selecting a single historical collection of blog entries corresponding to the identified subject, from among the multiple, normalized historical collections of blog entries;

determining the prevalence of the query terms over time within the single selected historical collection;

generating a line chart illustrating a change in the determined prevalence of the query terms over time, a line of the line chart including points which define hyperlinks to one or more blog entries of the selected single historical collection;

receiving a second user input selecting one of the hyperlinks; and presenting the blog entry associated with the selected hyperlink.

15. The system of claim 10, wherein:

generating the line chart further comprises generating a line chart illustrating the change in the determined prevalence over a time period specified by the user.

16. The system of claim 10, wherein the historical collection is weighted using an Okapi BM25 or Term frequency inverse document frequency (TFIDF) approach.

17. The system of claim 10, wherein the historical collection is vectorized using n-dimensional sparse vector arrays.

18. The system of claim 10, wherein the historical collection is weighted based on performing a dot product of a reverse index of the vectorized historical collection, and weights associated with the query terms.

19. The system of claim 10, wherein the operations further comprise identifying one or more weights associated with the collection of query terms.

20. The system of claim 10, wherein determining the prevalence of the query terms further comprises:

determining whether a univariate linear-regression of the prevalence of the query terms exhibits a shape associated with an idealized novelty event.

21. The system of claim 20, wherein the shape associated with the idealized novelty event comprises a horizontal linear shape followed by a sharply upward linear shape.

* * * * *

UNITED STATES PATENT AND TRADEMARK OFFICE
CERTIFICATE OF CORRECTION

PATENT NO.         : 7,685,091 B2
APPLICATION NO.    : 11/354668
DATED              : March 23, 2010
INVENTOR(S)        : Gary N. Boone et al.

It is certified that error appears in the above-identified patent and that said Letters Patent is hereby corrected as shown below:

On the Title page, in column 1, Item [75] line 1, inventors, delete "San Matco," and insert -- San Mateo, --, therefor.

On the Title page, in column 2, Item [56] under other publications, line 3, delete "Engneering," and insert -- Engineering, --, therefor.

On the Title page, in column 2, Item [56] under other publications, line 5, delete "Delievered.,"" and insert -- Delivered," --, therefor.

In column 19, line 14, in claim 9, delete "chaff" and insert -- chart --, therefor.

In column 20, line 25, in claim 15, delete "10," and insert -- 14, --, therefor.

In column 20, line 29, in claim 16, delete "10," and insert -- 14, --, therefor.

In column 20, line 32, in claim 17, delete "10," and insert -- 14, --, therefor.

In column 20, line 34, in claim 18, delete "10," and insert -- 14, --, therefor.

In column 20, line 38, in claim 19, delete "10," and insert -- 14, --, therefor.

In column 20, line 41, in claim 20, delete "10," and insert -- 14, --, therefor.

Signed and Sealed this
Twenty-fifth Day of January, 2011

David J. Kappos
*Director of the United States Patent and Trademark Office*